Sept. 26, 1933.   R. C. WARREN   1,928,083
BRAKE ROD CONSTRUCTION
Filed Aug. 31, 1932
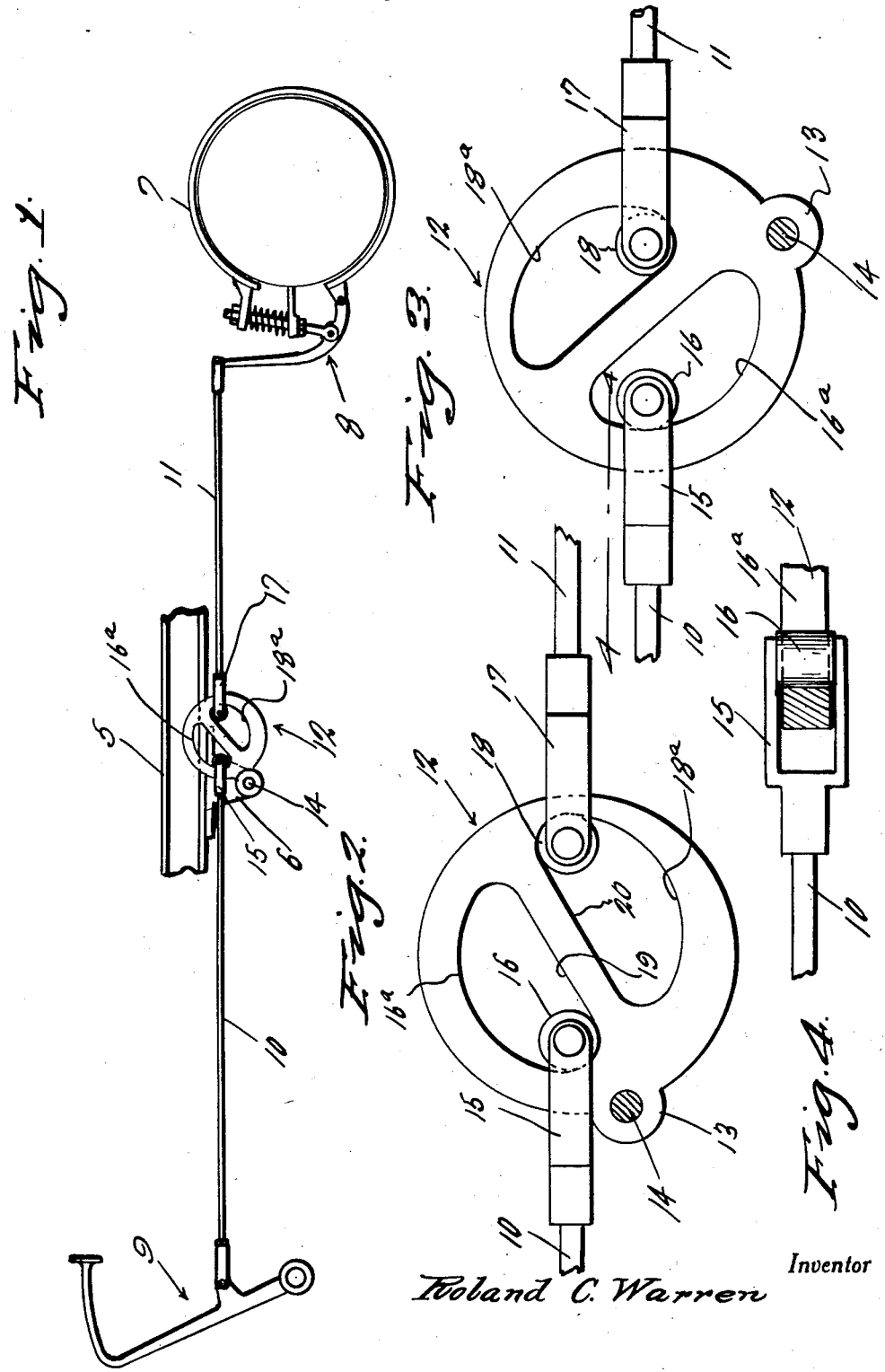
Inventor
Roland C. Warren
By Clarence A. O'Brien
Attorney Patented Sept. 26, 1933

1,928,083

UNITED STATES PATENT OFFICE 1,928,083

BRAKE ROD CONSTRUCTION

Roland C. Warren, Trenton, N. J.

Application August 31, 1932. Serial No. 631,233

1 Claim. (Cl. 74—110)

This invention relates to an improved brake rod for use in the construction of mechanical brakes whether operated through the medium of a foot pedal or a hand lever.

Briefly stated, the salient novelty is predicated upon the use of a brake rod comprising a pair of companion sections whose adjacent inner ends are operatively coupled together through the intermediacy of unique means for increasing the leverage and intensifying the power of the brake band in a dependable and practicable manner.

My primary aim is to generally improve upon brake rod structures possessing these general characteristics by providing an appreciably different selection and assembly of parts intimately coordinated and designed to promote sensitivity of operation, responsiveness, and continuity of stress from the pedal to the brake band contracting means in order to gain advantages not heretofore accomplished in similar prior art devices with which I am adequately familiar.

On the present day arrangement utilizing a one piece brake rod, approximately one-half of the travel of the brake pedal is wasted in order to take up existing lost motion in the mechanism. Manifestly by the time the brake bands are in braking contact with the drums, the greater portion of effective movement of the brake pedal has been spent with little travel of the rods. Consequently only the latter stroke or half of the travel of the brake pedal is directly effective on the brake bands.

Careful study and experimentation has enabled me to discover a simple mechanical movement, or association of elements embodied in a sectional brake rod which is advantageous in spontaneously changing the ratio of travel of the brake rod and pedal to the extent that the initial movement of the pedal takes up the lost motion promptly during which time the travel of the brake rod will be the greatest or greater than the pedal, while the latter movement of the brake pedal will speed up the leverage and power required for powerful embracement of the brake band around its associated drum.

In carrying the inventive conception into practice I have evolved and produced an efficient construction which accomplishes this change of leverage in a satisfactory manner without involving any extensive change in the position of the brake band contracting and expanding means or foot pedal or any appreciable increase in the pressure required for depressing the pedal.

In the accompanying drawing wherein like numerals are employed to designate like parts throughout the same.

Figure 1 is a side elevational view of the improved structure as designed and mechanically coordinated in accordance with the principles of this invention.

Figures 2 and 3 are elevational views showing the progressive starting and finishing positions of the novel converter disk.

Figure 4 is a section taken on the plane of the line 4—4 of Figure 3.

Referring first to Figure 1 of the drawing the numeral 5 designates a relatively stationary frame bar, 6 a hanger bracket rigidly secured thereto. The brake band is denoted by the numeral 7 and the contracting and expanding linkage or means by the numeral 8. The brake pedal is denoted by the numeral 9 and the brake rod or reach rod as it is sometimes called, is made up of a pair of companion sections 10 and 11 respectively. The section 10 is secured to the brake pedal and the section 11 to the band actuating means 8. The inner ends of these rods are operatively joined together by novel slack take up and compensating means which means is constructed to provide the requisite progressive action of the rods 10 and 11 in order to secure expeditious application and release of the brake band 7. The means comprises essentially a converter disk 12 having an ear 13 pivotally attached to the hanger bracket as at 14 in Figure 1. As a matter of distinction I call attention to Figures 2 and 3 wherein it will be observed that the rod 10 is provided at its inner end with a fork 15 carrying an anti-friction roller 16. Likewise, the rod 11 is provided at a corresponding end with a duplicate fork 17 and a complemental anti-friction roller 18. These rollers cooperate with arcuate cam surfaces 16a and 18a provided in the disk 12. These surfaces 16a and 18a are formed by providing staggered slots 19 and 20 in the disk. Incidentally it is obvious from an examination of Figure 2 that the distance from the pivot 14 of the disk 12 to the roller 16 is less than the distance from the same pivot to the roller 18, thereby producing quick release of the slack. From this figure it is also evident that the distance between the respective rollers 16 and 18 is greatest at this particular "starting" position.

In Figure 3 which is the finishing or "stopping" position the leverage action changes, the position of the roller 18 being then closer to the pivot 14 than the position of said roller 16 to the same pivot point. This causes the pressure of the foot pedal to be multiplied at the brake band.

Under this arrangement it is obvious that at the first application of pressure on the foot pedal all the lost motion and brake band clearance is rapidly taken up without requiring an increase of pressure on the pedal or stress on the rods 10 and 11. Secondly when the brake band has closed tightly around the drum in order to produce the requisite braking effect, the pressure on the foot pedal has been multiplied through the activity and expediency of the improved rods 10 and 11 joined operatively through the medium of the same equipped disk 12.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

What is claimed is:—

In a structure of the class described, a disk having an ear projecting from a part of its circumference, a pivot pin passing through said ear, said disk having a pair of substantially semi-circular openings therein, one opening being eccentrically arranged in the disk, a pair of rods, anti-friction means at the inner end of each rod, one engaging the arcuate wall of one opening and the other the arcuate wall of the other opening throughout the movement of the disk when said disk is moved by movement of one of the rods.

ROLAND C. WARREN.